June 19, 1928.
G. H. DAUBNER
1,674,097
LOCKING MEANS FOR HUB CAPS
Filed March 20, 1925
2 Sheets-Sheet 1
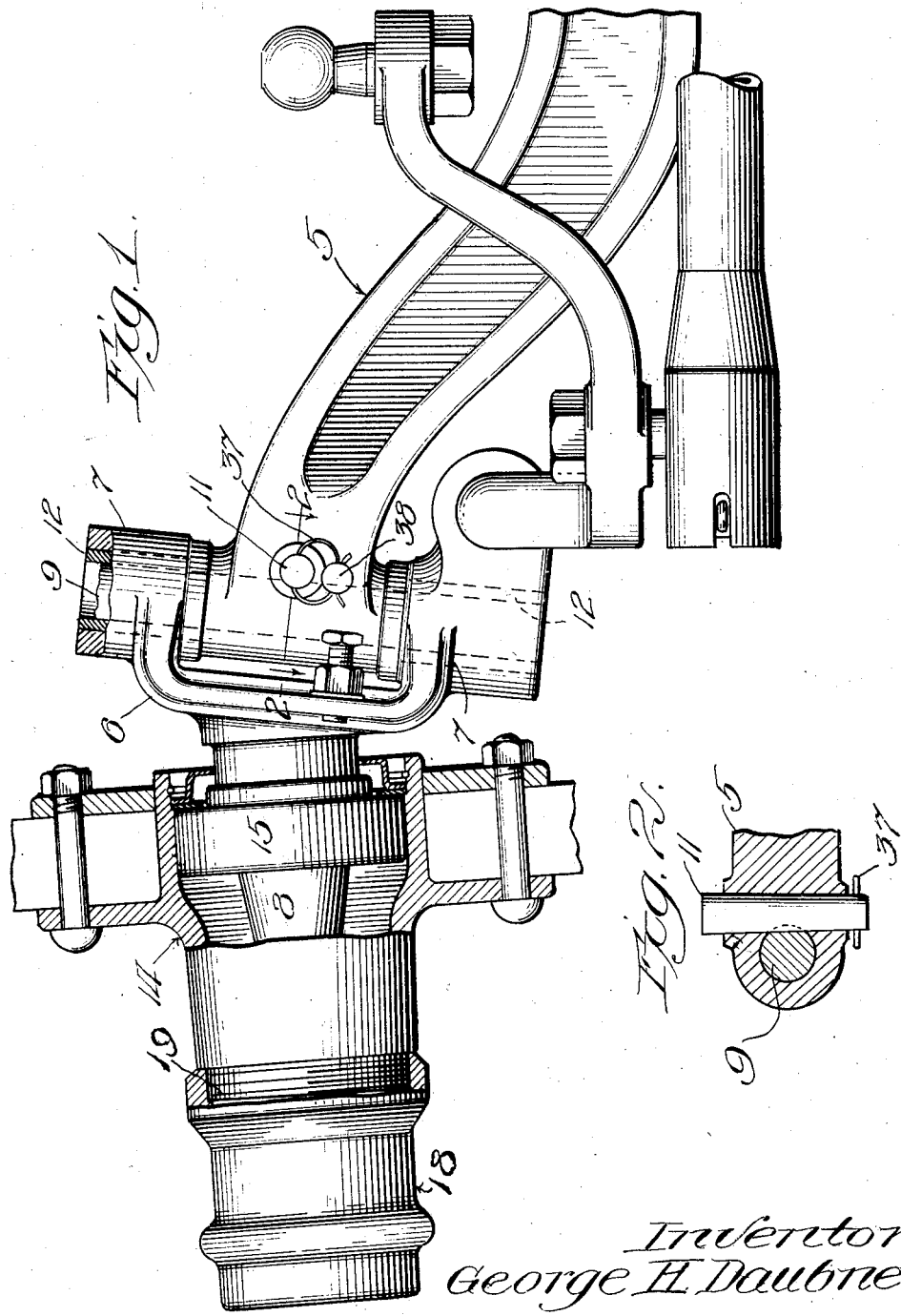
Inventor:
George H. Daubner
By Rector, Hibben, Davis and Macauley
Attys June 19, 1928.  1,674,097
G. H. DAUBNER
LOCKING MEANS FOR HUB CAPS
Filed March 20, 1925   2 Sheets-Sheet 2
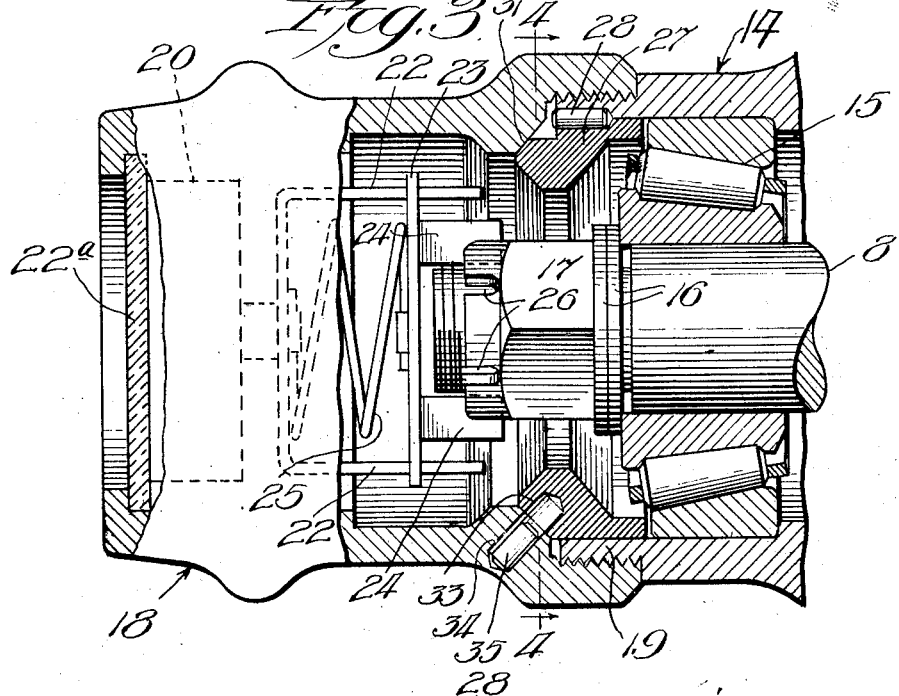
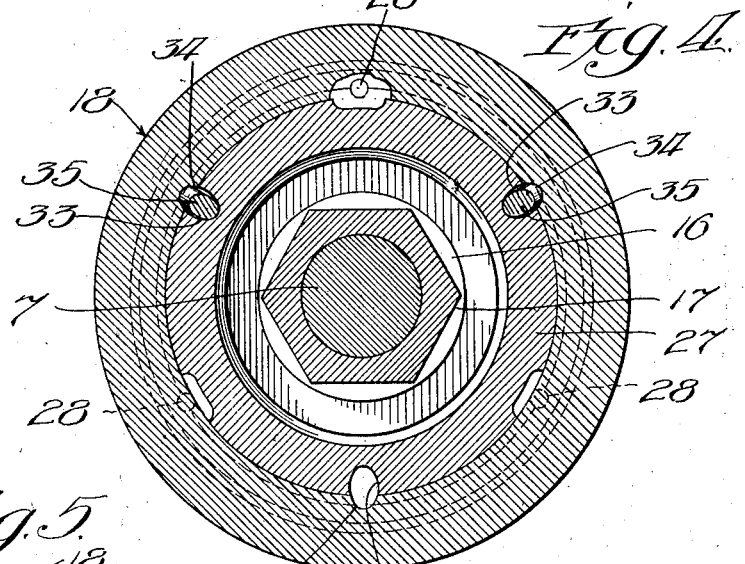
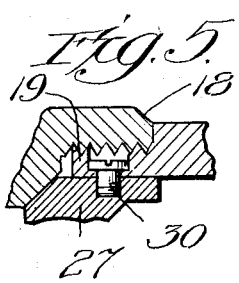
Inventor
George H. Daubner
By Rector, Hibben, Davis and Macauley
Attys Patented June 19, 1928.

1,674,097

UNITED STATES PATENT OFFICE.

GEORGE H. DAUBNER, OF OAK PARK, ILLINOIS, ASSIGNOR TO YELLOW CAB MANUFACTURING COMPANY, OF CHICAGO, ILLINOIS, A CORPORATION OF MAINE.

LOCKING MEANS FOR HUB CAPS.

Application filed March 20, 1925. Serial No. 17,145.

This invention relates to means for locking caps on the hubs of wheels of road vehicles and more particularly for locking on hub caps which carry odometers for registering the distance traveled by the vehicles. The invention is peculiarly adapted for use on motor vehicles which are rented for use and driven by the renter, the odometers being employed to record the number of miles traveled and the rental charges being based on the mileage. It is desirous to prevent the renter or other unauthorized person from removing the hub cap, in which the odometer is mounted, for the purpose of tampering with the odometer to change its registration or preventing its operation while off of the wheel and thus defraud the owner of the vehicle.

One of the objects of my invention is to provide simple and effective means for locking a cap or casing, containing an odometer, to the vehicle to prevent its unauthorized removal.

Another object of the invention is to so construct the means for locking the cap, containing the odometer, to the wheel hub as to make it necessary to remove the wheel from the axle and tilt it before the cap can be removed from the hub.

Still another object of the invention is to provide a telltale, such as a seal, which must be operated or broken before the wheel may be removed from the vehicle.

More particularly my invention, in the illustrative form of embodiment disclosed herein, comprises pins located in registering recesses in the wheel hub and cap to prevent the cap from being unscrewed from the hub when the wheel is attached to the vehicle, the pins being dropped in the longer recesses in the hub cap when the steering knuckle and wheel are removed from the axle and the wheel is placed in a horizontal plane with the hub cap underneath. The means for securing the steering knuckle to the axle is provided with a seal which must be broken in order to allow removal of the steering knuckle and wheel from the vehicle and thus permit the removal of the hub cap with the odometer.

Referring to the accompanying drawings, Fig. 1 is a rear elevation of a steering knuckle and part of the front axle, with parts shown in section and broken away; Fig. 2 is a fragmentary horizontal section taken on the line 2—2 of Fig. 1; Fig. 3 is an enlarged axial section through the end of the wheel hub and part of the hub cap; Fig. 4 is a transverse section taken on the line 4—4 of Fig. 3, and Fig. 5 is a fragmentary detail section showing a modified form of device for securing the ring in position in the end of the wheel hub.

Referring to Fig. 1, the front axle 5 may be of any approved construction as may be the steering knuckle 6. The steering knuckle comprises the wheel spindle 8 and the fork forming the arms 7. The pivot or king pin 9 extends through openings in the ends of the arms 7 and axle 5. The steering knuckle rotates about the ends of the pin 9, suitable bearings 12 being mounted in the openings in the arms 7. The hub 14 of the road wheel is carried by two sets of roller bearings 15 mounted on the spindle 8. The wheel is held on the spindle 8 by means of washers 16 and a nut 17. The inner washer bears against the outer end of the inner race of the outer bearing 15 and the nut 17 is screwed on the threaded end of the spindle to force and retain the washers against the race.

A hub cap 18 is internally threaded at its inner end so that it may be screwed to the externally threaded outer end 19 of the hub 14. Mounted in the hub cap, in any suitable manner, is an odometer 20 (shown diagrammatically) which has suitable indicating means for indicating the mileage traveled by the vehicle through a glass window 22ª on the outer end of the hub cap. The odometer carries two projecting arms 22 on which is slidably mounted a bar 23 having two oppositely positioned inwardly extending arms 24. When the hub cap is in position on the hub, a coil spring 25 causes the ends of the arms 24 to engage in recesses 26 formed in the castellated nut 17. As is well understood in the art, when the vehicle is running, the spindle 8 does not rotate and as the hub cap and odometer are rotated with the wheel the odometer is operated through the rods 22, the bar 23 and the arms 24 which are held against rotation by the nut 17.

The construction, as far as has been described, is well known. My invention consists in providing effective means for locking the cap 18 to the hub to prevent unauthorized removal of the hub cap 18 and odometer from the vehicle. To this end, I provide a ring 27 which is positioned within the outer end 19 of the hub. I preferably secure the ring within the hub and against relative rotation by means of pins 28, preferably three in number, which fit snugly in circular openings formed between the end 19 of the hub and the ring 27, half of each opening being formed in each member. If desired, the ring 27 may be secured in position by screws 30, also preferably three in number, which project through holes in the end 19 of the hub and are screwed into threaded openings in the ring 27 as indicated in Fig. 5.

The ring 27 has an inclined face 31 adapted to be engaged by a complementary inclined face or surface on the hub cap when the hub cap is in position of the hub. These complementary faces are provided with recesses 33 and 34, the recesses 33 being in the ring 27 and the recesses 34 in the hub cap. There are preferably three of these recesses in the ring and cap, equally spaced so that when the cap is in position on the hub the recesses 33 and 34 are in register. Located in these coinciding recesses 33 and 34 are plungers or pins 35, which are of lesser diameter than the recesses to permit them to freely reciprocate. It will be noted that the recesses 34 are as deep as the length of the pins whereas the recesses 33 are of lesser depth so that when a pin 35 is seated in the end of a recess 33 the outer end of the pin projects into the recess 34, thus preventing the hub cap from being unscrewed from the hub. It is obvious that the deeper recesses may be formed with the ring 27 and the shallower ones in the cap, if desired. During rotation of the wheel the pins 35 may slide back and forth in the coinciding recesses due to the changes in angularity of the recesses, but as there are a plurality of pins, at least one of the pins at any instant projects into its recess 33.

The end of the tapered pin 11 is provided with a hole through which a ring or wire 37 projects and the ends of the ring or wire are twisted or otherwise brought together and a seal 38, of any desired form, is placed over the ends so that the ring or wire cannot be removed without breaking the seal or the ring or wire and hence without detection.

It will be apparent from the foregoing that when the wheel is attached to the vehicle, with the hub cap 18 in place, the latter cannot be removed from the wheel hub because at least one of the pins 33 projects into its recess 33 in the ring 27. If it is desirable to remove the hub cap 18 to inspect or repair the odometer or permit removal of the wheel hub from the steering knuckle, the seal 38 is broken and the wire 37 is removed from the pin 11. The pin 11 is then driven out of place and the king bolt 9 removed which permits removal of the steering knuckle and wheel from the axle. The wheel is then placed in a horizontal position with the hub cap underneath. Upon this movement of the wheel hub all of the pins 35 fall into the deeper recesses 34 so that they do not project into the recesses 33 and thus the hub cap is unlocked and its removal is permitted. To replace the hub on the wheel the reverse operation is performed, the cap being screwed on the hub of the wheel while the latter is in a horizontal plane, after which the steering knuckle may be attached to the axle.

From the foregoing description it will be apparent that I have provided novel and simple means for performing the objects primarily stated. At the same time it is to be understood that these means are susceptible of various modifications without departure from the scope and spirit of the invention as defined in the following claims.

I claim:

1. The combination with a vehicle having a wheel with a hub and hub cap, of a lock for said cap comprising pins reciprocable in a plurality of circumferentially arranged registering recesses in said hub and cap, the recesses in one being deeper than those in the other to permit said pins to be carried therein solely when said wheel and knuckle are removed from the axle and tilted to permit said cap to be removed from said hub.

2. The combination with a vehicle having a wheel with a hub and a hub cap, of a lock for said cap comprising inclined registering recesses in said hub and cap, the recesses in the cap being deeper than those in the hub, pins in said registering recesses adapted to project into the recesses in the cap when seated in the recesses in the hub and adapted to drop entirely within the recesses in the cap when the wheel is tilted with the cap below in order to permit removal of the cap from the hub.

3. In a vehicle, the combination with a wheel having a hub and a hub cap screwed on the end of said hub, of a lock comprising a ring within the end of said hub, means securing the ring in position thereon, inclined registering recesses in said ring and cap, the receses in one being deeper than those in the other and the recesses in the cap extending only partly through the cap, and pins in said recesses each adapted to project into the recesses in both the cap and ring when seated in the shallower recesses but not into the shallower recesses when seated in the deeper recesses and all of the pins being seated in the deeper recesses when the wheel is in a tilted position to permit removal of the cap from the hub.

4. In a vehicle, the combination of a wheel having a hub with inclined circumferentially spaced recesses therein, a hub cap having inclined circumferentially spaced recesses registering with the recesses in the hub, and locking pins disposed in said registering recesses, at least some of said locking pins being operative to interlock the hub cap to the hub when the wheel is in its normal operative position and to drop entirely into the said recesses when the wheel is tilted to an inoperative position to permit removal of the cap from the hub.

5. In a vehicle, the combination of a wheel having a hub, a cap on the end of said hub, inclined registering recesses in the hub and cap, the recesses in one being deeper than those in the other, and pins longer than the recesses in the one but not longer than the recesses in the other and adapted to reciprocate in said registering recesses and to be moved into the deeper recesses to permit removal of the cap from the hub.

6. In a vehicle, the combination of a wheel having a hub with a plurality of circumferentially spaced recesses therein, a hub cap having circumferentially spaced recesses adapted to register with the recesses in the hub, a plurality of locking devices located within the recesses, at least one of said locking devices being operative to interlock the hub cap to the hub when the wheel is in its vertical operative position, said hub cap recesses being arranged to entirely receive the locking devices when the wheel is placed in an abnormal position to permit removal of the cap from the hub.

GEORGE H. DAUBNER.